A. TRAVIS.
DOUBLE ACTING LEAF SPRING.
APPLICATION FILED JAN. 18, 1913. RENEWED JAN. 14, 1915.
1,147,578.
Patented July 20, 1915.
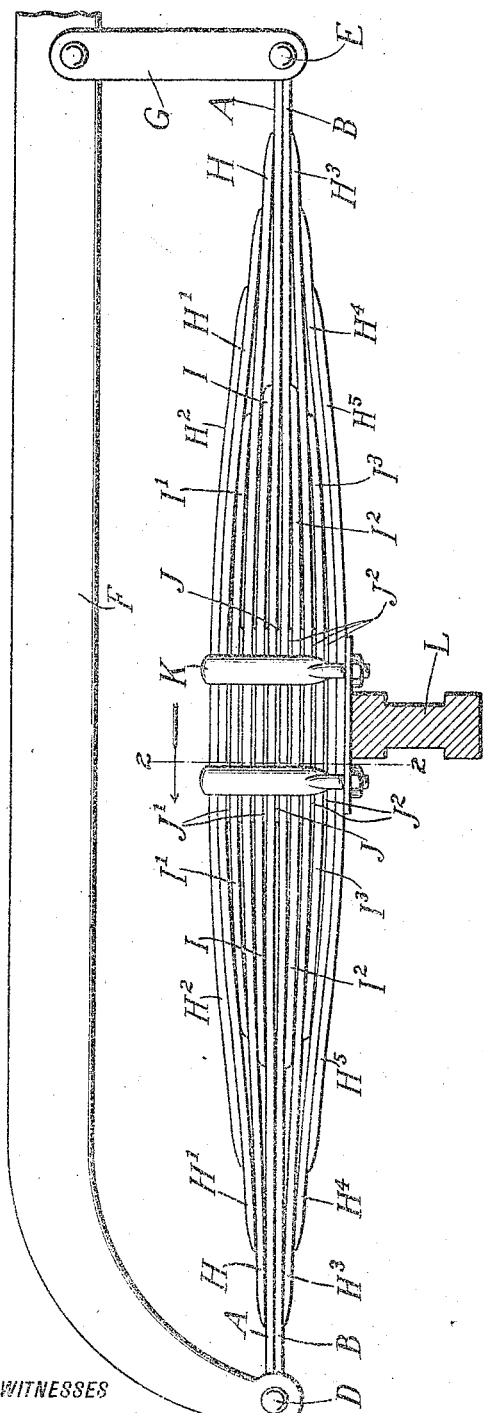
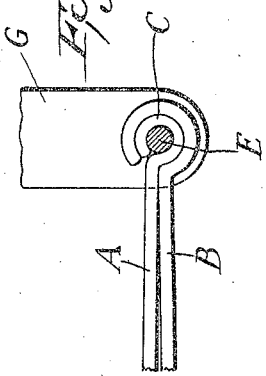
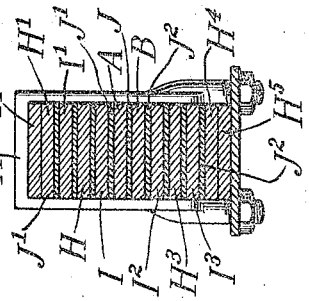
WITNESSES
INVENTOR,
Albro Travis,
BY
ATTORNEYS

UNITED STATES PATENT OFFICE.

ALBRO TRAVIS, OF BREWSTER, NEW YORK, ASSIGNOR TO JOSEPH LYNCH, OF ALBANY, NEW YORK.

DOUBLE-ACTING LEAF-SPRING.

1,147,578.      Specification of Letters Patent.      Patented July 20, 1915.

Application filed January 18, 1913, Serial No. 742,837. Renewed January 14, 1915. Serial No. 2,243.

*To all whom it may concern:*

Be it known that I, ALBRO TRAVIS, a citizen of the United States, and a resident of Brewster, in the county of Putnam and State of New York, have invented a new and Improved Double-Acting Leaf-Spring, of which the following is a full, clear, and exact description.

The object of the invention is to provide a new and improved double-acting leaf spring more especially designed for use on automobiles and other vehicles and arranged to take up strains in both a downward and an upward direction thus acting as a shock absorber by taking up all jolts and jars whenever the vehicle wheels pass over gutters or obstructions in the roadway.

In order to accomplish the desired result, use is made of long central leaves arranged at their ends for connection with suspension devices, and two sets of short leaves, one set being arranged above and the other set being located below the said central leaves.

A practical embodiment of the invention is represented in the accompanying drawings forming a part of this specification, in which similar characters of reference indicate corresponding parts in all the views.

Figure 1 is a side elevation of the double-acting leaf spring as applied to a vehicle, the axle of which is shown in section; Fig. 2 is an enlarged transverse section of the same on the line 2—2 of Fig. 1; and Fig. 3 is an enlarged sectional side elevation of one end of the spring and its support.

Two long leaves A and B are arranged in the middle of the double-acting leaf spring and the ends of the said long leaves terminate in eyes C engaging pins D and E, of which the pin D is held on the frame F of the vehicle body while the pin E is held in a link G depending from the said frame F, as plainly indicated in Fig. 1. Above the uppermost leaf A are arranged a series of short leaves H, H′, H² and a similar set of springs H³, H⁴, H⁵ is arranged below the long central leaf B. The short leaves H′ and H² are superimposed and likewise the leaves H⁴ and H⁵, as shown in Fig. 1. Intermediate the leaves A and H is arranged a reinforcing leaf I, and a similar reinforcing leaf I′ is arranged between the short leaves H and H′. A reinforcing leaf I² is arranged between the long leaf B and the short leaf H³, and a reinforcing leaf I³ is arranged between the short leaves H³ and H⁴. A spacing block or washer J is interposed between the long leaves A and B at the middle thereof, similar spacing blocks J′ are interposed between the leaves A, I, H, I′ and H′ on the upper portion of the double-acting leaf spring, and similar spacing blocks J² are arranged between the leaves B, I², H³, I³ and H⁴ at the lower portion of the double-acting leaf spring. The several parts of the spring are fastened together at the middle by a suitable clip K, also used for connecting the middle of the double-acting leaf spring to the axle L.

It will be noticed that the reinforcing leaves I, I′, I² and I³ terminate approximately midway between the outer ends of the corresponding leaves H, H′ and H³, H⁴, and the outer ends of the corresponding spacing blocks J′ and J². It will also be noticed that the long central leaves A and B are approximately straight, and the remaining portions of the double-acting leaf spring are built up equally above and below the said central leaves to take up strains both in an upward and downward direction at the time the wheels of the vehicle pass over gutters or obstructions in the roadway, it being understood that the long central leaves A and B and the sets of leaves below are mainly active when the vehicle passes up on the obstruction, and the set of leaves above the same become active mainly during the rebound, that is, during the time the wheels travel from the obstruction down onto the roadway.

By providing the spacing blocks and the reinforcing leaves I, I′, I² and I³ the several leaves are free to act when pressure is applied, and the leaves A, B, H, H′, H³ and H⁴ are not liable to break owing to the reinforcing leaves I, I′, I² and I³.

It will further be noticed that by the arrangement described the leaf spring acts equally well in both an upward and downward direction, and practically becomes a shock absorber by taking up all jolts and jars, thus insuring easy riding in the vehicle.

By constructing the double-acting leaf spring in the manner described there are practically no weak parts in it and consequently the individual members are not liable to break, and hence long life of the spring is insured.

Having thus described my invention, I claim as new and desire to secure by Letters Patent:

1. A double-acting leaf spring, comprising a pair of normally straight long central leaves terminating at their ends in suspension means, a spacing block between the said central leaves at the middle thereof, and two sets of short leaves, of which one set is above the uppermost central leaf and the other set is below the undermost central leaf.

2. A double-acting leaf spring provided with long central leaves arranged at their ends for connection with suspension devices, two sets of short leaves, one set above and the other set below the said central leaves, and reinforcing leaves interposed between the said central leaves and the leaves of the said sets of short leaves and of a length less than that of the short leaves.

3. A double-acting leaf spring provided with long central leaves arranged at their ends for connection with suspension devices, two sets of short leaves, one set above and the other set below the said central leaves, reinforcing leaves interposed between the said central leaves and the leaves of the said sets of short leaves, and spring blocks between all of the leaves at the middle thereof.

4. A double-acting leaf spring provided with long central leaves arranged at their ends for connection with suspension devices, two sets of short leaves, one set above and the other set below the said central leaves, reinforcing leaves interposed between the said central leaves and the leaves of the said sets of short leaves, and spacing blocks between the leaves at the middle thereof, the said reinforcing leaves terminating at their outer ends at points intermediate the outer ends of the sets of short leaves and the outer ends of the spacing blocks.

5. A double-acting leaf spring, comprising a pair of normally straight long central leaves terminating at their ends in suspension means, a spring block between the said central leaves at the middle thereof, two sets of short leaves, of which one set is above the uppermost central leaf and the other set is below the undermost central leaf, the two uppermost leaves of the upper set of short leaves and the two lowermost leaves of the lower set of short leaves being superimposed, reinforcing leaves interposed between the long central leaves and the inner leaf of each set and also between the two innermost leaves of the upper and lower sets of leaves, spacing blocks intermediate all of the leaves at the middle thereof, and clipping means for fastening the parts together at the middle of the spring.

6. A double-acting leaf spring comprising a pair of long center leaves arranged at their ends for connection to suspension devices, two sets of leaves arranged upon opposite sides of the long leaves, each of said sets comprising leaves gradually shortening in length from the innermost leaf to the outermost leaf, and reinforcing leaves which are shorter in length than the shortest of the leaves of the two sets, arranged between the long center leaves of each of the said sets of leaves.

In testimony whereof I have signed my name to this specification in the presence of two subscribing witnesses.

ALBRO TRAVIS.

Witnesses:
P. T. CORNELL,
CYRUS L. TRAVIS.